US008673040B2

(12) United States Patent
Handley et al.

(10) Patent No.: US 8,673,040 B2
(45) Date of Patent: Mar. 18, 2014

(54) FILTER CONSTRUCTION FOR USE WITH AIR IN-TAKE FOR GAS TURBINE AND METHODS

(75) Inventors: Michael W. Handley, Farmington, MN (US); Mark Brandenhoff, Lakeville, MN (US); Kirit Patel, Bridgewater, NJ (US); Timothy D. Sporre, Brooklyn Park, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 12/482,911

(22) Filed: Jun. 11, 2009

(65) Prior Publication Data

US 2011/0048228 A1 Mar. 3, 2011

Related U.S. Application Data (60) Provisional application No. 61/061,408, filed on Jun. 13, 2008.

(51) Int. Cl.
*B01D 46/00* (2006.01)
*B01D 46/52* (2006.01)

(52) U.S. Cl.
USPC ............... 55/486; 55/302; 55/385.1; 55/487; 55/497; 55/498; 55/521; 55/524; 55/528; 95/280; 95/285

(58) Field of Classification Search
USPC .................... 95/45, 280, 285, 286, 287; 96/4; 55/302, 385.1, 486, 487, 497, 498, 55/521, 524, 527, 528
See application file for complete search history.

(56) References Cited

U.S. PATENT DOCUMENTS

| 6,123,751 | A | 9/2000 | Nelson et al. |
| 6,517,612 | B1 * | 2/2003 | Crouch et al. ................. 55/528 |
| 6,582,113 | B2 | 6/2003 | Rogers |
| 7,008,465 | B2 * | 3/2006 | Graham et al. ................ 55/486 |
| 7,156,898 | B2 * | 1/2007 | Jaisinghani .................... 55/521 |
| 7,837,756 | B2 * | 11/2010 | Choi ............................... 55/527 |
| 2003/0010210 | A1 * | 1/2003 | Kawano et al. ................ 95/287 |
| 2004/0074387 | A1 | 4/2004 | Jaisinghani |
| 2004/0255783 | A1 | 12/2004 | Graham et al. |
| 2006/0096263 | A1 | 5/2006 | Kahlbaugh et al. |
| 2006/0137318 | A1 | 6/2006 | Lim et al. |
| 2009/0031682 | A1 * | 2/2009 | Langlands et al. ............. 55/378 |
| 2009/0266048 | A1 * | 10/2009 | Schwarz ..................... 60/39.092 |

FOREIGN PATENT DOCUMENTS

| EP | 1 260 261 | A1 | 11/2002 |
| EP | 1 674 144 | A1 | 6/2006 |
| EP | 1 787 705 | | 5/2007 |
| FR | 2 259 996 | | 8/1975 |

OTHER PUBLICATIONS

"Donaldson Torit(R) Cartridge Filters", Donaldson Company, Inc., 2002, 10 pages.*

(Continued)

*Primary Examiner* — Jason M Greene
(74) *Attorney, Agent, or Firm* — Merchant & Gould P.C.

(57) ABSTRACT

The filter of the invention is a cartridge filter comprising a structure that can maintain a filter medium in an air stream to filter particulates to protect a gas turbine power system. The filter combines a mechanically adequate filter structure and an effective filter medium for to obtain a useful system.

24 Claims, 7 Drawing Sheets

(56) References Cited

OTHER PUBLICATIONS

International Search Report and Written Opinion mailed Aug. 4, 2009.

Declaration of Thomas D. Raether dated Jan. 11, 2012.
Sep. 16, 2013 Office Action for U.S. Appl. No. 13/616,627.

* cited by examiner

FILTER CONSTRUCTION FOR USE WITH AIR IN-TAKE FOR GAS TURBINE AND METHODS

REFERENCE TO RELATED APPLICATIONS

This application claims priority under 35 USC 119(e) from U.S. Provisional Application 61/061,408 filed on Jun. 13, 2008, to the extent appropriate. The entirety of the disclosure of U.S. Patent Application 61/061,408 is hereby incorporated herein by reference.

TECHNICAL FIELD

The present disclosure relates to air filter systems. In certain applications it concerns air filters for use in the air intake stream of gas turbine systems. Methods of filtering to achieve such effect are also provided.

BACKGROUND

Although the present disclosure may be applied in a variety of applications, it was developed for use with gas turbine filter systems. Gas turbine systems are useful in generating electricity. These types of systems are particularly convenient in that they can be constructed quickly; they are also desirable because they produce fewer harmful emissions than coal or oil based turbine systems. Gas turbines utilize air for combustion purposes. Due to the precision moving parts in these types of systems, the combustion air needs to be clean. To ensure clean air for combustion, air filters have been used to clean the air taken into the gas turbine system.

Filters are used to purify the air intake for gas turbines. The filter media used for the purification, over time, will load with contaminant. Filters are used until they are plugged (contaminant blocks all flow through the media) or until a predetermined restriction level is reached. Both are associated with flow and the work necessary to move the flow. Either too little fluid is allowed to flow through, or too much work is required to move the desired flow due to the higher restriction.

SUMMARY

The filter of the invention is a filter comprising a structure that can maintain a filter medium in an air stream to filter particulates to protect a gas turbine power system. The filter combines a mechanically adequate filter structure and an effective filter medium for to obtain a useful system.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION

A durable, effective filter includes filtration media that is capable of being exposed to repeated exposures to particulate, water and other environmental conditions without degradation. A hydrophobic material that provides a barrier to particulate and liquid penetration is useful. Suitable filtration materials that can be used include expanded polytetrafluoroethylene (PTFE) membrane.

An expanded PTFE filter is used with the present invention. Expanded PTFE is made in accordance with U.S. Pat. Nos. 3,953,566, 3,962,153, 4,096,227, and 4,187,390, all are specifically incorporated by reference herein for the disclosure of the polymer and its expansion. This material is formed by heating and rapidly expanding PTFE in at least one direction. When processed in this manner, the expanded PTFE forms a microscopic structure of polymeric nodes interconnected by fibrils. Space between the nodes and fibrils are micropores that allow the passage of air and water vapor, but are too small to permit passage of liquid water or even fine water droplets. The overall structure is a barrier to particulate.

The expanded PTFE filter material for use with the present invention comprises a single layer of expanded PTFE membrane, the layer has a thickness greater than 0.1 mm or 0.1 to 1 mm thick. The final sheet ideally has the following properties. The pore size of greater than 0.1 micron to 10 micron, and a permeability range of 2 to 40 fpm. Pore size measurements may be made by ASTM f31 6-03 using a Capillary Flow Porometer (Model CFP 1500 AEXL from Porous Materials, Inc., Ithaca, N.Y.).

The preferred expanded PTFE filter for use in the present invention provides a filtration efficiency of 60 to 99.9%, or more, at 0.3 microns. Ideally, the filter has an efficiency of 99.0 to 99.9% at 0.3 microns.

Expanded PTFE materials are produced using processes that provide an expanded layer made of nodes of interconnecting fibrils, typically considered to be related to layer formation. The preferred fluorinated thermoplastic is polytetrafluoroethylene, however, other fluorinated materials can be used such as fluorinated ethylene propylene (FEP) and other fluorinated thermoplastic materials. Such materials include copolymers of tetrafluoroethylene, polychlorotrifluoroethylene and other fluorinated materials. Other suitable membranes include membrane materials made from polypropylene and polyethylene.

The porous layer of expanded PTFE used in a fabric can be an expanded, porous PTFE layer that can satisfy the requirements of being waterproof while also being permeable to the flow of gases such as air and water vapor. Expanded porous PTFE layers are inherently hydrophobic and contain pores that resist the entry of liquid water even at substantial pressures or when rubbed or flexed, but readily allow the flow of gases. Unlike conventional PTFE layer fabric materials with sealed or closed pores that transport water through diffusion and are impermeable to bulk airflow, the permeability of the present invention is achieved by gaseous flow of air and water vapor through the layer to the clean side.

The PTFE filter material is then layered or laminated to a porous backing material, such as a porous polyester nonwoven, paper, felt, sintered polypropelene, polyethylene, polyimide, polyamide, etc. In order to increase exposed surface area, the filter material can then be folded into multiple pleats and then installed in a "rippled" or "pleated" orientation into the filtration apparatus. The pleated material can be formed into a cylinder or "tube" and then bonded together such as through the use of an adhesive (urethane, hot-melt glue, etc.), or ultrasonic welding, for example. The structure typically comprises a PTFE layer that is substantially free of any agent that fills the pores created by stretching the PTFE into a stretched porous fabric. The hydrophobic PTFE layer, having small pore sizes, can act as a barrier to particulate and aerosols, or, using its hydrophobic nature, repel liquid agents.

The filter can include an outer layer, either a woven or non-woven material that can act to protect the PTFE layer from damage, contamination or wear. Often the outer shell is combined with the PTFE layer using a variety of manufacturing techniques; however, such a combination is preferably manufactured using thermal bonding or adhesive lamination technology. Thermal bonding to the shell is the preferred method. In other multilayer constructions, the PTFE layer might be layered next to shell material, and not laminated. For example, the PTFE layer might be sewn together with the shell.

The filter can further comprise a reactive layer that includes an absorbent or adsorbent material that is active in absorbing, adsorbing and/or deactivating gaseous chemical or biological warfare agents from the ambient atmosphere as it penetrates the fabric. A variety of active chemical treatment materials and active and/or passive adsorbents or absorbents can be present in such layer.

A. System, FIG. 1

Figure 1:
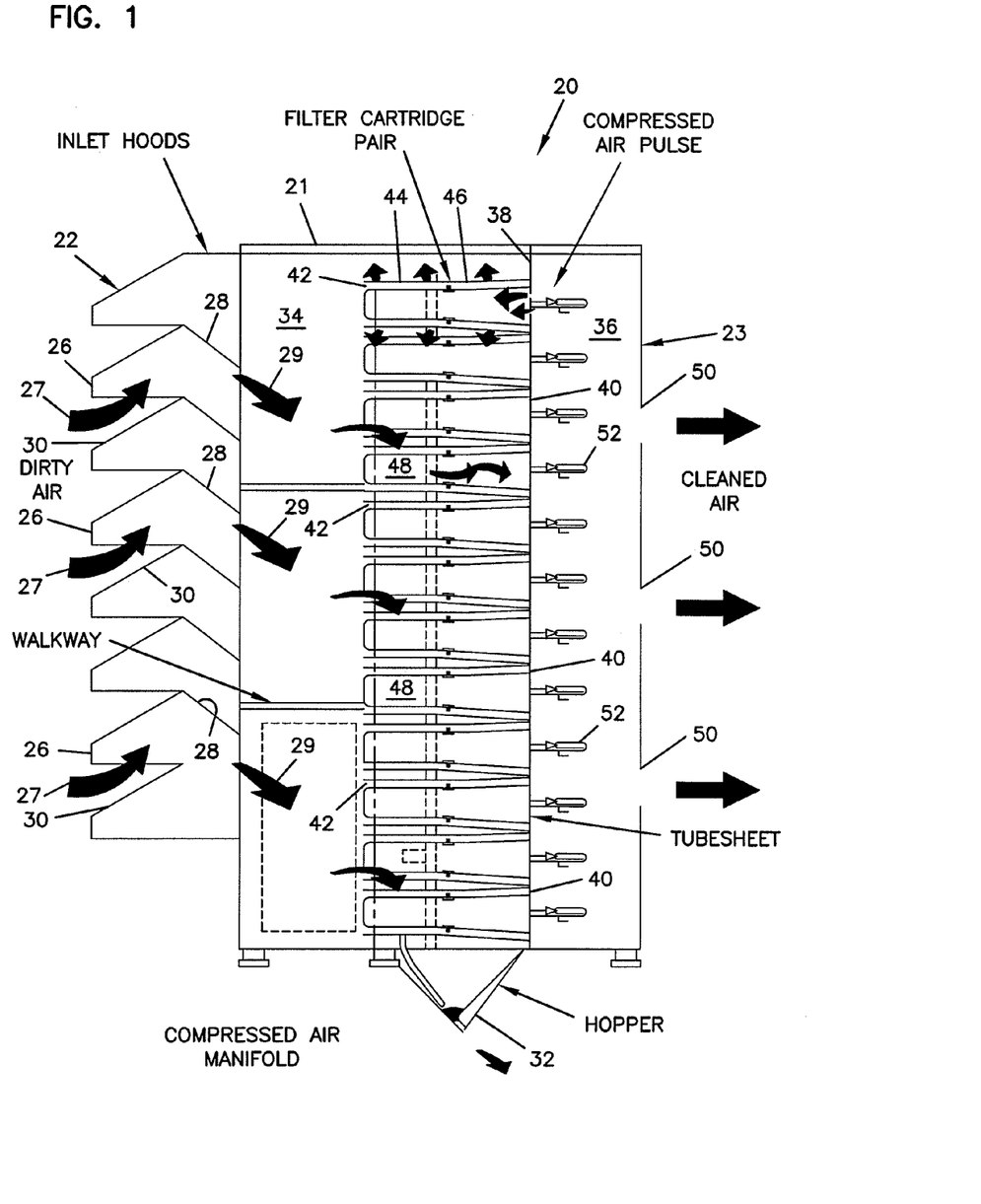
FIG. 1 is a schematic side elevational view of a first embodiment of an air intake for a gas turbine system with a plurality of filter elements, constructed in accordance with principles of this disclosure.

In FIG. 1, a schematic, cross-sectional, depiction of a gas turbine air intake system is depicted at 20. The system 20 includes a chamber 21 having an air inlet side 22 and an air outlet side 23. Air enters the chamber 21 through a plurality of vertically spaced inlet hoods 26 positioned along the air inlet side 22. The inlet hoods 26, although not required, function to protect internal filters of the system 20 from the effects of rain, snow and sun. Also, the inlet hoods 26 are configured such that air entering the inlet hoods 26 is first directed in an upward direction indicated by arrow 27, and then deflected by deflector plates 28 in a downward direction indicated by arrow 29. The initial upward movement of air causes some particulate material and moisture from the air stream to settle or accumulate on lower regions 30 of the inlet hoods 26. The subsequent downward movement of air forces dust within the chamber 21 downward toward a dust collection hopper 32 located at the bottom of the chamber 21. It should also be noted that air inlet side 22 may have vanes and other mechanical moisture separator inlets.

The chamber 21 of the system 20 is divided into upstream and downstream volumes 34 and 36 by a tube sheet 38 (referred to also as partition 38). The upstream volume 34 generally represents the "dirty air section" of the air cleaner system 20, while the downstream volume 36 generally represents the "clean air section" of the system 20. The tubesheet 38 defines a plurality of apertures 40 for allowing air to flow from the upstream volume 34 to the downstream volume 36. Each aperture 40 is covered by an air filter 42 or filter cartridge located in the upstream volume 34 of the chamber. The filters 42 have a filter medium comprising at least a PTFE layer as describe above or comprises a PTFE layer on a suitable support layer. The PTFE layer is on the upstream side of the medium. The filters 42 are arranged and configured such that air flowing from the upstream volume 34 to the downstream volume 36 passes through the filters 42 prior to passing through the apertures 40.

For the particular filter arrangement shown in FIG. 1, each air filter 42 includes a pair of filter elements. For example, each air filter 42 includes a cylindrical element 44 and, a somewhat truncated, conical, element 46. Each truncated, conical element 46 includes one end having a major diameter and another end having a minor diameter. The cylindrical element 44 and the truncated, conical element 46 of each filter 42 are co-axially aligned and connected end-to-end with the minor diameter end of each conical element 46 being secured to one of the cylindrical elements 44 in a sealed manner. The major diameter end of each truncated, conical element 46 is secured to the partition 38 such that an annular seal is formed around its corresponding aperture 40. Each filter 42 is generally co-axially aligned with respect to its corresponding aperture 40 and has a longitudinal axis that is generally horizontal.

Other shapes and types of filter elements can be used, as described below.

In general, during filtering, air is directed from the upstream volume 34 through the PTFE layer of the filter medium on air filters 42 into interior volumes 48 of the filters 42. After being filtered, the air flows from the interior volumes 48 through the partition 38, via apertures 40, into the downstream clean air volume 36. The clean air is then drawn out from the downstream volume 36 and into a gas turbine intake, not shown.

In this embodiment, each aperture 40 of the partition 38 includes a pulse jet air cleaner 52 mounted in the downstream volume 36. Periodically, the pulse jet air cleaner 52 is operated to direct a pulse jet of air backwardly through the associated air filter 42, i.e. from the interior volume 48 of the filter element outwardly to shake or otherwise dislodge particular material trapped in or on the PTFE layer of filter media of the air filter 42. The pulse jet air cleaners 52 can be sequentially operated from the top to the bottom of the chamber 21 to eventually direct the dust particulate material blown from the filters into the lower hopper 32, for removal. In many air pulse jet cleaning applications, a useful air pressure is generally within the range of 60 to 1500 psi. A stream of liquid, such as water, soaps, degreasers, and solvents of any kind can also dislodge particulate from the PTFE layer alone or in conjunction with the reverse air. In many liquid jet applications, a useful liquid pressure is generally within the range of 0 to 120 psi.

The properties of PTFE are such that captured particulate matter will not easily adhere to the PTFE layer in typical applications. By locating the PTFE layer on the upstream side of the filter medium, the layer is easily accessible for cleaning. As discussed previously, the cleaning of the PTFE layer can therefore be readily accomplished by various means such as air pulse cleaning or upstream washing with liquid or air. As a result, the useful service life of the filter medium can be significantly increased when the PTFE layer is located on the upstream side of the filter medium. Further, because a PTFE layer can be applied to virtually any size and style of filter medium, retrofit installations in existing systems can be readily accomplished without the need for extensive equipment modification. Thus, a gas turbine owner or operator can economically obtain a filter that has both a higher efficiency and better moisture removal characteristics than most typical filters.

B. System, FIG. 2

Figure 2:
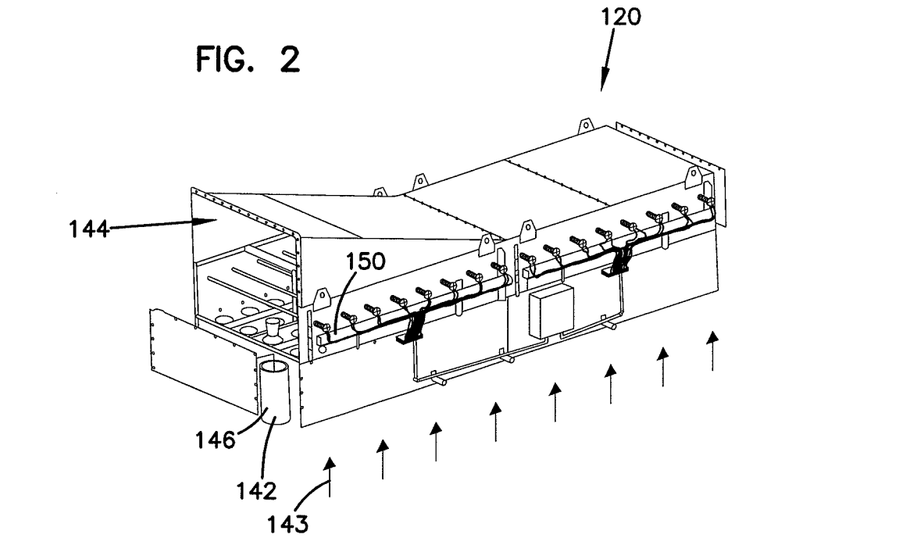
FIG. 2 is a schematic side elevational view of second embodiment of an air intake for a gas turbine system with a plurality of filter elements, constructed in accordance with principles of this disclosure.

In FIG. 2, a schematic, cross-sectional depiction of another embodiment of a gas turbine air intake system is depicted at 120. In this embodiment, there are a plurality of filter elements 142 arranged vertically such that air to be filtered flows from a direction shown by arrows 143 upwardly, through the elements 142 and then into a clean air volume 144.

In this embodiment, because of the orientation of the elements 142 and the direction of air flow, if there was any moisture, the moisture will flow by gravity downwardly along the elements 142 to a position underneath the system 120. In the embodiment shown in FIG. 2, each of the elements 142 is constructed of a cylinder of pleated media 146. The pleats in the pleated media 146 run vertically with the direction of the orientation of the elements 142. Therefore, any water or other types of moisture that contacts the media 146 will drain down along the pleats due to gravity. FIG. 2 also depicts a reverse flow pulse cleaning system 150. The reverse flow pulse cleaning system 150 emits a pulse of compressed gas periodically, such that the pulse of air will go from the downstream side through the media 146 to the upstream side. This helps to knock loose any particulate or other types of debris from the upstream side of the filter media, and periodically cleans the elements.

In other embodiments, instead of using a reverse pulse cleaning system, the elements can be cleaned from the upstream side. In such systems, the elements can be sprayed with a jet of liquid or a jet of gas. In such systems, the upstream side of the filter media is at least partially cleaned of debris and particulate matter due to the spray or jet of liquid or air washing off the upstream side of the media.

C. Example Media Constructions, FIGS. 3-13

FIGS. 3-13 depict various embodiments of filter elements using the PTFE medium that are usable in gas turbine air intake systems, such as systems 20, 120 characterized above.

Figure 3:
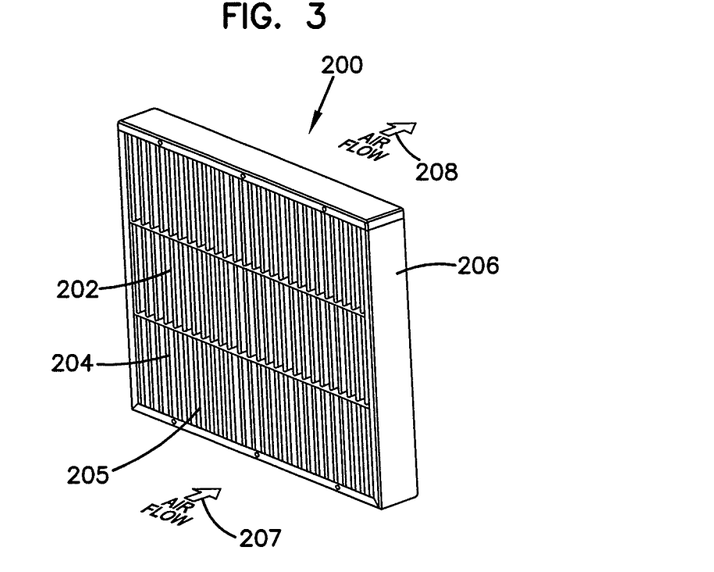
FIG. 3 is a perspective view of one embodiment of a filter element usable in the air intake systems for gas turbines, constructed in accordance with principles of this disclosure.

In FIG. 3, a pleated panel element 200 is shown in perspective view. The panel element 200 includes a media pack 202 of pleated media 204. The pleated media 204 can comprise the filter medium having a layer of a support or substrate combined with a layer of the PTFE. In the embodiment shown, the media pack 202 is held within a frame 206, with the examples shown being a rectangular frame 206. The frame 206 typically will include a gasket (not shown) for permitting the element 200 to be sealed against a tube sheet, such as tube sheet 38, in the intake system 20, 120. In FIG. 3, the upstream side of the pleated media 204 with the exterior PTFE layer is shown at 205 on the same side as the incoming air shown at arrow 207. The cleaned air is shown at arrow 208, and emerges from the media 204 from a downstream side of the media.

Figure 4:
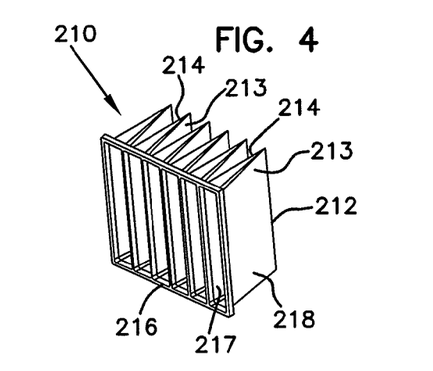
FIG. 4 is a perspective view of another embodiment of another element with the PTFE filter medium of the invention usable in gas turbine systems, constructed in accordance with principles of this disclosure.

FIG. 4, depicts a perspective view of pocket filter element 210. The pocket element 210 includes a layer of filter media 212 that can comprise the filter medium having a layer of a support or substrate combined with a layer of the PTFE. In the embodiment shown, the pocket element 210 includes a plurality of panel pairs 213, 214, with each panel pair 213, 214 forming a V-like shape. The PTFE media 212 is secured to a frame 216. The frame 216 typically will carry a gasket for allowing the pocket element 210 to be sealed against a tube sheet, such as tube sheet 38. In such an arrangement, the media 212 has an upstream PTFE side 217, which is inside of the V's, and a downstream side 218, which is on the outside of the V's.

Figure 5:
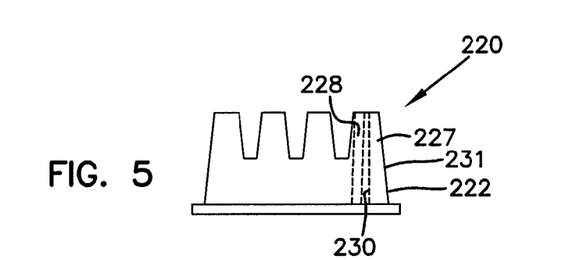
FIG. 5 is a top plan view of another filter element with the PTFE filter medium of the invention usable in an air intake for a gas turbine system, constructed in accordance with principles of this disclosure.
Figure 6:
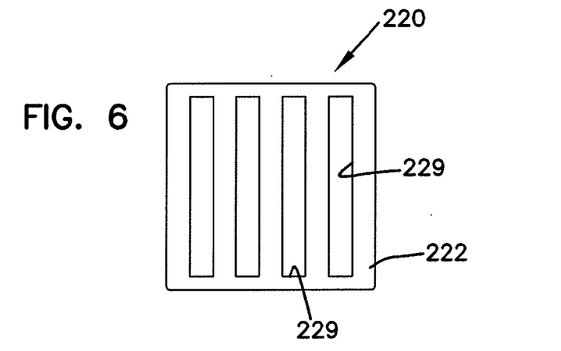
FIG. 6 is a front elevational view of the element of FIG. 5.
Figure 7:
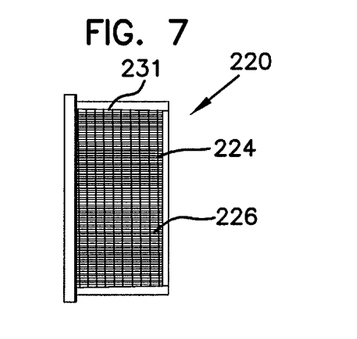
FIG. 7 is a right side elevational view of the filter element of FIG. 6.

FIGS. 5-7 depict views of a mini-pleat or multi-V style element 220. The element 220 includes a frame 222 holding a filter media pack 224 (FIG. 7). The media pack 224 comprises a plurality of mini-pleats. The mini-pleats are arranged in a panel 226, and the element 220 includes a plurality of mini-pleated panel pairs 227, 228 (FIG. 5) of the media of the invention, each forming a V-like shape. In FIG. 5, the panel pairs 227, 228 are shown in hidden lines, since the top portion of the frame 222 obstructs the view of the panel pairs 227, 228. The frame 222 defines a plurality of dirty air inlets 229 (FIG. 6), which leads to the inside part of each V of each pleated panel pair 227, 228. Each pleated panel pair 227, 228 includes an upstream side 230, which is on the inside of the V, and a downstream side 231, which is on the outside of the V.

Figure 8:
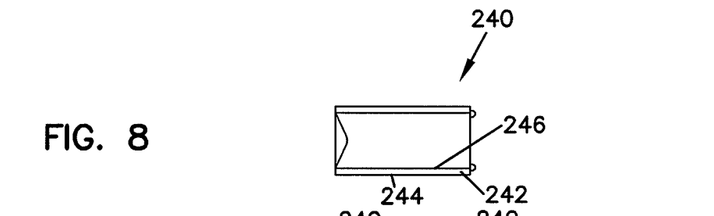
FIGS. 8-12 are schematic, cross-sectional views of further embodiments of filter elements usable in an air intake for a gas turbine system, constructed in accordance with principles of this disclosure.

FIGS. 8-13 show various embodiments of tubular, pleated filter elements. FIG. 8 shows a cylindrical pleated element 240 having a media pack 242 that can comprise the filter medium having a layer of a support or substrate combined with a layer of the PTFE with an upstream side 244 and a downstream side 246. The downstream side 246 is inside of the interior volume of the element 240.

Figure 9:
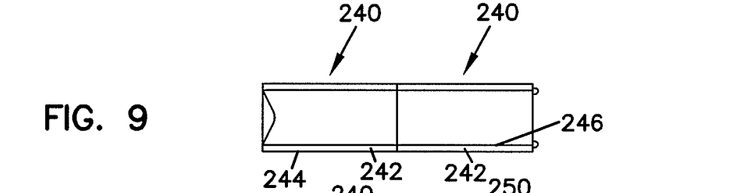

FIG. 9 depicts two of the cylindrical elements 240 axially aligned, such that they are stacked end to end.

Figure 10:
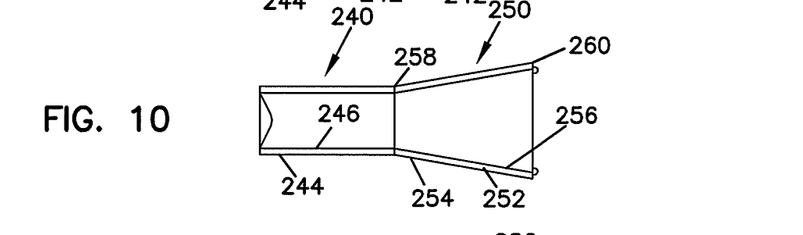

FIG. 10 depicts the arrangement shown in the example embodiment of FIG. 1. In FIG. 10, cylindrical element 240 is axially aligned with a partially conical element 250. The partially conical element 250 is a tubular element having a media pack 252 that can comprise the filter medium having a layer of a support or substrate combined with a layer of the PTFE. The element has an upstream side 254 and a downstream side 256. The conical element 250 has a first end 258 having a diameter that matches the diameter of the cylindrical element 240. The conical element 250 includes a second end 260 having a diameter that is larger than the diameter of the first end 258, thus forming the partial cone.

Figure 11:
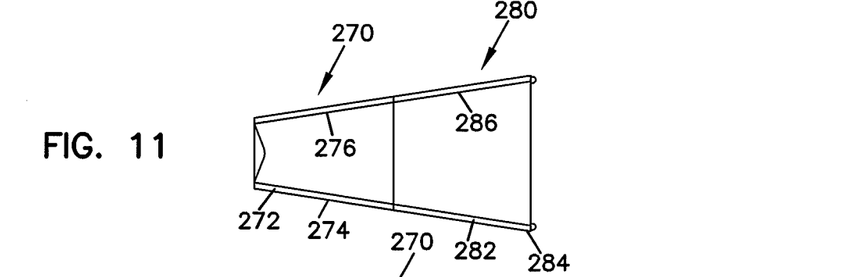

FIG. 11 depicts two partially conical elements 270, 280 arranged axially, and engaged end to end. Each of the elements 270 includes a media pack 272, 282 forming a tube that can comprise the filter medium having a layer of a support or substrate combined with a layer of the PTFE. The media packs 272, 282 each has an upstream side 274, 284 and a downstream side 276, 286.

Figure 12:
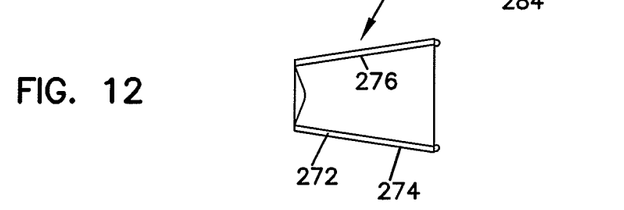

FIG. 12 shows a single conical element 270. The element 270 can be used alone installed in the intake system for a gas turbine without being installed in element pairs, as shown in FIGS. 10 and 11.

Figure 13:
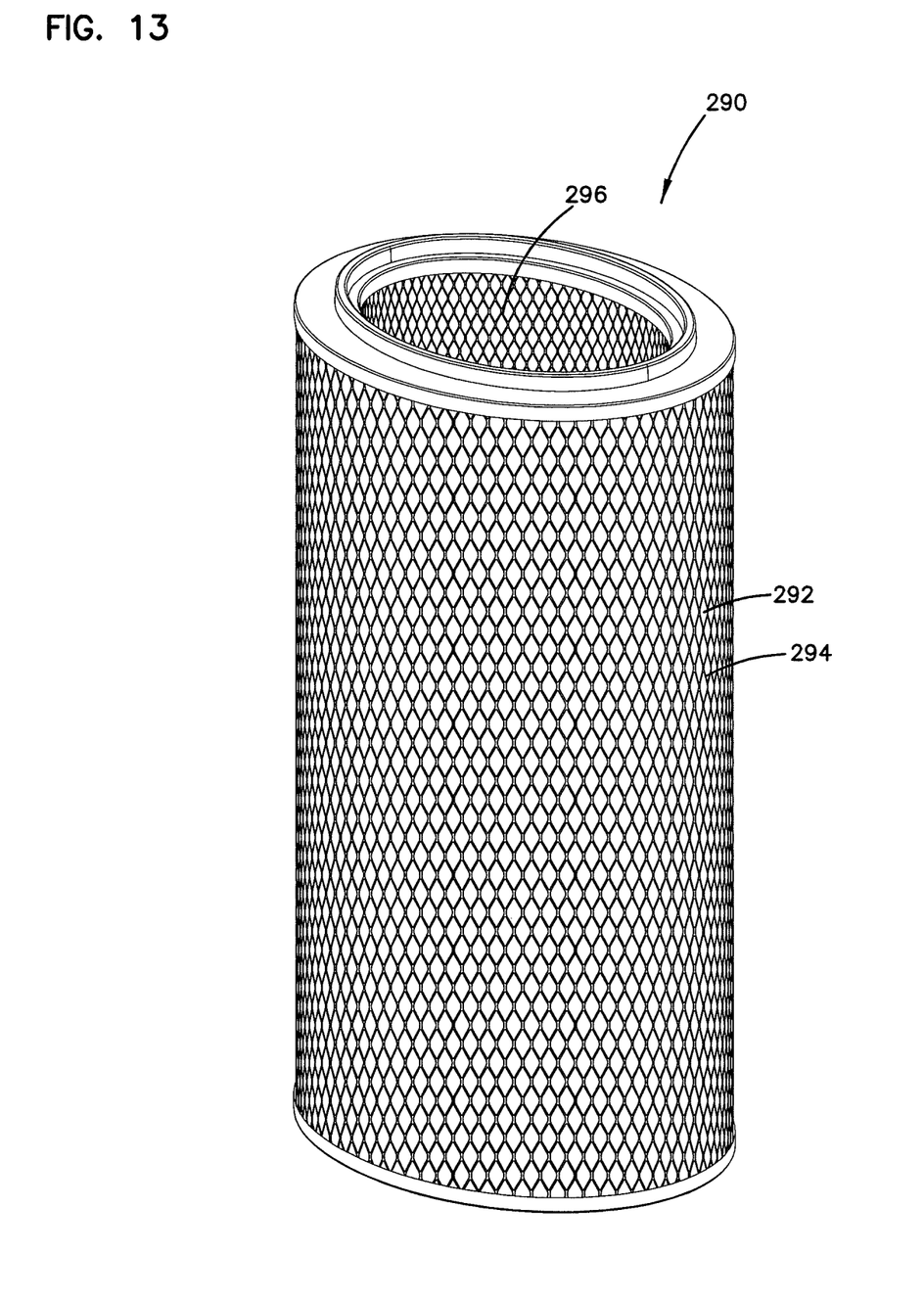
FIG. 13 is a perspective view of another embodiment of a filter element usable in an air intake for a gas turbine system, constructed in accordance with principles of this disclosure.

FIG. 13 is another embodiment of a filter element 290 having media pack 292 that can comprise the filter medium having a layer of a support or substrate combined with a layer of the PTFE. The media pack 292 is pleated and forms a tubular shape. In this embodiment, the tubular shape is an oval shape, and in one example embodiment, a ratio of the short axis compared to the long axis of the oval is about 0.7-0.9. The media 292 includes an upstream side 294 and a downstream side 296.

It should be understood that each of the filter elements characterized above and depicted in FIGS. 3-13 can be flat media and/or operably installed in an intake or ventilation system for a gas turbine, such as system 20 or system 120 of FIGS. 1 and 2.

In operation, air to be filtered will be directed through the upstream side, typically the PTFE layer and then through the downstream side of filter media in the respective filter element typically installed in a tube sheet. The filter media will remove at least some of the particulate from the air stream. After passing through the downstream side of the media, the filtered air is then directed to the gas turbine.

The filter elements can be cleaned. In operation, a method of cleaning a filter element for a gas turbine air intake system includes removing at least some particulate material from the upstream side of the media pack of the filter element operably installed in the tube sheet of the gas turbine air intake system. The step of removing can include pulsing a jet of compressed gas from the downstream side to the upstream side. Alternatively, the step of removing can include spraying the upstream side with a jet of air or liquid. Alternatively, the cleaning step can use a reverse air step and a liquid stream, serially or in combination.

D. Example Media Formulations

This invention provides improved PTFE filtration media and pulse cleanable filter elements thereof, to protect gas turbine systems from the deleterious effects of salt, moisture and hydrocarbons at the intake air of gas turbine systems. Furthermore, other outdoor filtration applications include the protection of electronic enclosures at cell base towers can benefits from the improved media technology. PTFE filtration layer is provided on a substrate. The substrate can be of any kind that can be laminated or otherwise combined with the PTFE layer. The substrate can have properties beyond its service as a surface for the PTFE. These properties can include coalescing, depth loading etc. It is also important to recognize that the substrate layer provides the necessary anchoring surface for not only the PTFE layer but also for any additional nanofiber media layer such as "electroblown" nanofiber layer/hybrid membrane (example DuPont HMT). The surface of such PTFE laminate media may be treated with oleophobic treatment to repel hydrocarbons in the air.

Example 1

Figure 14:
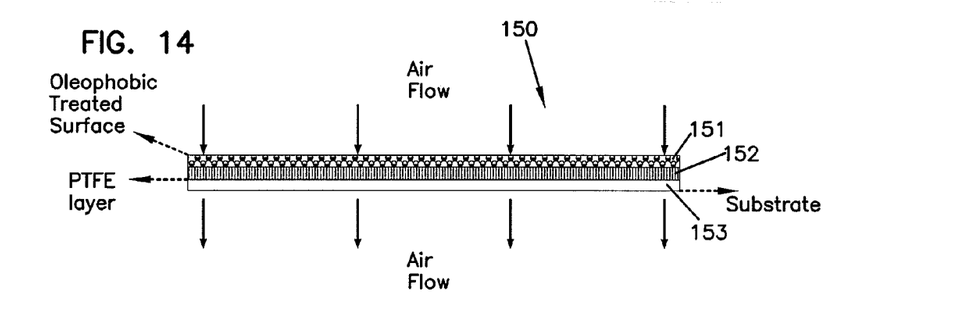
FIG. 14-18 are cross section views of the media of the invention.
Figure 18:
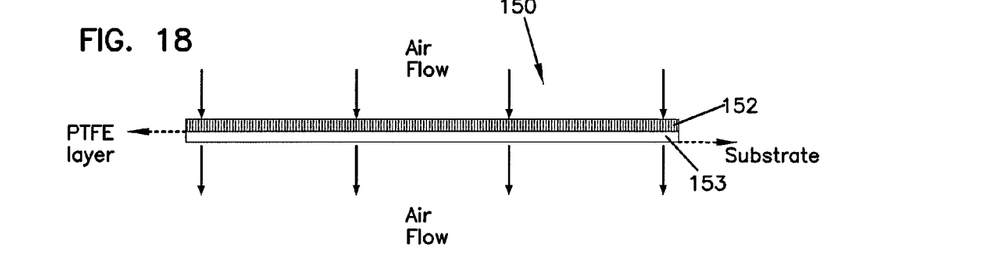

FIGS. 14 and 18 show a cross section of one embodiment of the media of the invention. In FIGS. 14 and 18, the media 150 includes a membrane layer, referred to as PTFE layer 152. Media 150 also includes a substrate layer 153 for supporting PTFE layer 152, and optionally for further filtering the air stream. Substrate layer 153 may be wet laid or air laid and may be comprised of spunbond media. On FIG. 14 specifically, media 150 also includes first oleophobic coating 151 on the membrane layer 152. Such oleophobic coatings can comprise any coating material that has substantial hydrophobicity. Such materials are often non-hydrophilic but repel oil and other organic substances. Such coatings are common and are well known to one of ordinary skill in the art. The oleophobic coating 151 covers the PTFE layer 152.

Figure 15:
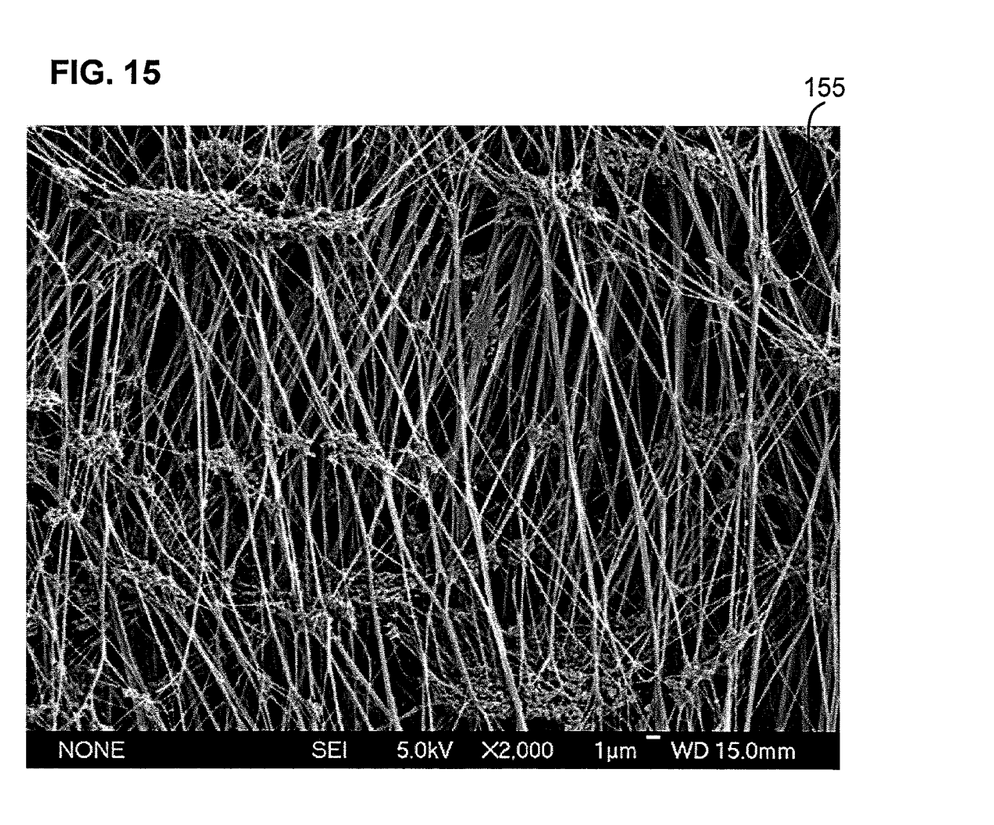

FIG. 15 shows a electron photomicrograph of the expanded PTFE layer of the invention. In the figure are fibers 155.

The final laminate will provide resistance to salt, water and hydrocarbons in the air. The minimum efficiency of the media will be Merv 14 or F9 (EN1822 standard). Also, the finished cartridge element using this type of media will have similar initial restrictions at same air flow as current media being used on existing system. This media further can be designed to have efficiency higher than HEPA and H12-H-13 (EN1822, MPP efficiency 99.95% @ 0.08 micron).

Example 2

Figure 16:
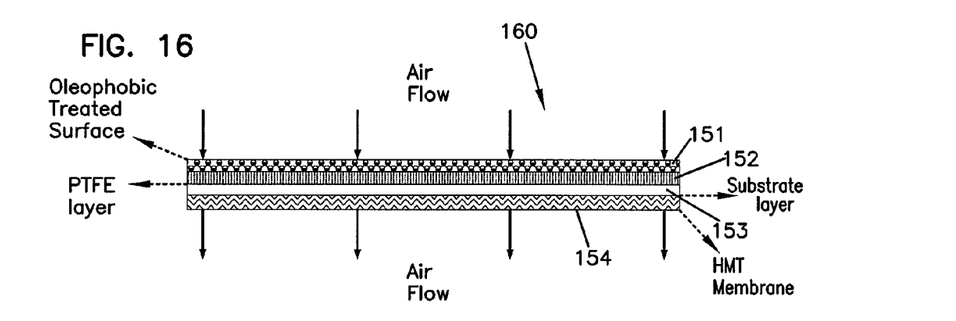

The media construction in FIG. 16 is similar to Example #1, except that it will have another media downstream of the PTFE filtration layer. Similarly, FIG. 16 shows a preferred media embodiment of the invention. Similarly, media layer 160 is a multilayer structure. The media comprises an oleophobic layer 151, a PTFE layer 152, a conventional melt blown substrate 153 and a hybrid membrane layer 154. The downstream layer 154 can be another layer of membrane, more specifically but not limited to electroblown nanofiber membrane. A hybrid membrane layer is made by using a spinning process to create a membrane-like nonwoven sheet structure of continuous sub-micron polymeric filaments between 200-600 nanometers. Hybrid membranes are referred to as a nanofiber because the filtration industry, our predominant end use market, broadly uses the term "nanofiber" to describe any fiber between the size of 100 nm to about 800 nm. This is important because especially in environments with high humidity and abundance of salt particles, i.e. marine environments such as off shore or seaside environments, it is necessary to protect the critical equipment downstream of the filtration arrangement from the deleterious impact of nano-sized airborne salt that can be generated by wave breaking and is carried by the wind, which can in turn deliquesce or change physical state with varying humidity conditions and penetrate through the filtration arrangement and foul the equipment downstream. It is worth noting here that the particulates that can change physical state may not be limited to salt. It can include other forms of particulate matter. Also, it is important to recognize that conditions suitable for the particulate to change physical state can be realized in environments beyond marine environments described above. Certain localities or industrial processes can result in the right environmental conditions for the salt or other particulate types to deliquesce and penetration through the filter arrangement.

The salt particles and other fine particles escaping through PTFE layer will have added protection to be captured in downstream media there by assuring 100% capture of such particles to prevent any blade erosion.

Example 3

Figure 17:
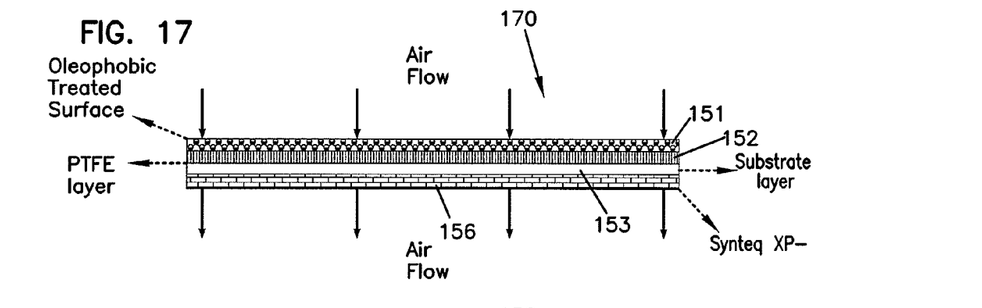

In this example, a wet laid media (See FIG. 17) is used on the down stream side of the composite. FIG. 17 shows a version of the media of the invention using a wet layer substrate material. In FIG. 17 a media 170 is shown. The media comprises a wet laid substrate 156, a conventional cellulosic or air layer substrate 153, the PTFE layer 152 and an external upstream oleophobic layer 151. The wet laid media can have a gradient density if needed but it is essentially intended to provide a depth loading structure and is used to increase the efficiency of the media by capturing any particles escaping through upstream filtration media. A suitable wet laid media that can be used in this application is Donaldson's Synteq XP technology. Donaldson's U.S. Pat. No. 7,314,497 which is incorporated, especially herein for its disclosure of a media layer that can be made by combining bicomponent fiber with other fiber sources including other filtration fibers, binder fibers, reinforcing fibers, reactive fibers and other components.

We claim:
1. A filter element installed in a filtration system for a gas turbine; the filter element comprising:
 a media pack having a most upstream side and a downstream side and arranged to be operably installed in the filtration system to provide gas to be filtered to flow through the media pack from the most upstream side to the downstream side;

the media pack comprising a media layer comprising a support layer and a membrane layer; the membrane layer being on the most upstream side;

the media pack including an oleophobic coating on the upstream side of the membrane layer; and the media pack further comprising a depth loading structure downstream of the support layer, wherein the depth loading structure is a wet laid substrate comprising bicomponent fibers.

2. A filter element according to claim 1 wherein the membrane layer comprises expanded PTFE.

3. A filter element according to claim 1 wherein the support layer is a wet laid support layer or an air laid support layer.

4. A filter element according to claim 1 wherein the media pack includes a pocket element having a plurality of panel pairs, each pair forming a V-like shape.

5. A filter element according to claim 1 wherein the media pack includes a plurality of mini-pleated panel pairs, each pair forming a V-like shape.

6. A filter element according to claim 1 further comprising a hybrid membrane layer, the hybrid membrane layer being downstream of the support layer.

7. A filtration system for a gas turbine comprising:
(a) a partition;
(b) a plurality of filter elements operably installed in or on the partition; each of the filter elements including a media pack having a most upstream side and a downstream side to provide gas to be filtered to flow through the media pack from the most upstream side to the downstream side;

the media pack comprising a media layer comprising a support layer and a membrane layer; the membrane layer being on the most upstream side;

the media pack including an oleophobic coating on the upstream side of the membrane layer; and the media pack further comprising a depth loading structure downstream of the support layer, wherein the depth loading structure is a wet laid substrate comprising bicomponent fibers.

8. A filtration system according to claim 7 wherein the membrane layer comprises expanded PTFE.

9. A filtration system according to claim 7 further including a pulse system to periodically emit a pulse of compressed fluid from the downstream side of the media to the most upstream side of the media.

10. A filtration system according to claim 9 wherein the membrane layer comprises expanded PTFE and the support layer is spunbond media.

11. A filtration system according to claim 7 further including an upstream cleaning system to emit a spray of fluid at the most upstream side of the media.

12. A filtration system according to claim 7 wherein the media pack includes a pocket element having a plurality of panel pairs, each pair forming a V-like shape.

13. A filtration system according to claim 7 wherein the media pack includes a plurality of mini-pleated panel pairs, each pair forming a V-like shape.

14. A method of filtering air for a gas turbine system; the method comprising:
(a) directing air to be filtered through a most upstream side and then through a downstream side of filter media in a filter element installed in a partition; the filter media comprising a support layer and a membrane layer that is on the most upstream side of the support layer;

the media pack including an oleophobic coating on the upstream side of the membrane layer; the media pack further comprising a depth loading structure downstream of the support layer, wherein the depth loading structure is a wet laid substrate comprising bicomponent fibers; and (b) directing the filtered air to the gas turbine.

15. A method according to claim 14 wherein the membrane layer comprises expanded PTFE.

16. A method according to claim 14 wherein the step of directing air to be filtered includes directing air through one of a pleated panel, a pocket filter, a V-pack construction, a tubular construction, and a cylindrical, conical, or oval construction.

17. A method of cleaning a filter element for a gas turbine air intake system; the method comprising:
removing at least some particulate material from a most upstream side of a media pack of a filter element operably installed in a partition of a gas turbine air intake system or alone to provide air flow from the most upstream side to a downstream side; the media pack comprising a media layer comprising a support layer and a membrane layer; the membrane layer being on the most upstream side; the media pack including an oleophobic coating on the upstream side of the membrane layer; the media pack further comprising a depth loading structure downstream of the support layer, wherein the depth loading structure is a wet laid substrate comprising bicomponent fibers.

18. A method according to claim 17 wherein the membrane layer comprises expanded PTFE.

19. A method according to claim 17 wherein the step of removing includes pulsing a jet of compressed gas from the downstream to the upstream side.

20. A method according to claim 19 wherein the step of removing includes spraying the upstream side with a jet of air or liquid.

21. A filter element according to claim 1 wherein the support layer includes spunbond media.

22. A filtration system according to claim 7 wherein the support layer includes spunbond media.

23. A method according to claim 14 wherein the step of directing air to be filtered includes directing air through filter media wherein the support layer includes spunbond media.

24. A method according to claim 17 wherein the step of removing includes removing from a media pack wherein the support layer includes spunbond media.

* * * * *